(12) United States Patent
Kammans

(10) Patent No.: US 7,684,115 B2
(45) Date of Patent: Mar. 23, 2010

(54) TELESCOPE WITH VARIABLE MAGNIFICATION

(75) Inventor: Sigrun Kammans, Herborn (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 12/365,912

(22) Filed: Feb. 5, 2009

(65) Prior Publication Data

US 2009/0141346 A1  Jun. 4, 2009

Related U.S. Application Data

(63) Continuation of application No. PCT/DE2007/001392, filed on Aug. 6, 2007.

(30) Foreign Application Priority Data

Aug. 8, 2006  (DE) .................. 10 2006 036 942

(51) Int. Cl.
*G02B 23/00* (2006.01)
*G02B 15/14* (2006.01)

(52) U.S. Cl. .................. 359/422; 359/399; 359/432

(58) Field of Classification Search ......... 359/399–430, 359/676, 694–706, 738–740
See application file for complete search history.

(56) References Cited

U.S. PATENT DOCUMENTS

| | | | |
|---|---|---|---|
| 2,479,792 A | 8/1949 | Tackaberry | |
| 3,161,716 A | 12/1964 | Burris et al. | |
| 3,782,822 A | 1/1974 | Spence | |
| 3,970,366 A * | 7/1976 | Sekiguchi | 359/683 |
| 4,172,634 A | 10/1979 | Thompson | |
| 4,255,013 A | 3/1981 | Allen | |
| 5,020,892 A | 6/1991 | Glover et al. | |
| 5,444,569 A * | 8/1995 | Broome | 359/435 |
| 5,663,839 A * | 9/1997 | Kanno | 359/700 |
| 5,790,316 A * | 8/1998 | Terasawa et al. | 359/687 |
| 6,560,036 B2 | 5/2003 | Takahashi et al. | |
| 7,133,219 B1 | 11/2006 | Whitty | |
| 2007/0159685 A1 * | 7/2007 | Wagner et al. | 359/365 |

FOREIGN PATENT DOCUMENTS

| | | |
|---|---|---|
| DE | 33 26 464 A1 | 1/1985 |
| DE | 10 2006 021 364 A1 | 11/2006 |
| FR | 943 810 A | 3/1949 |
| GB | 690 309 A | 4/1953 |

* cited by examiner

*Primary Examiner*—Thong Nguyen
(74) *Attorney, Agent, or Firm*—Foley & Lardner LLP

(57) ABSTRACT

A description is given of a telescopic sight with variable magnification, comprising a fixed objective and first image plane assigned thereto, a variable system with second image plane assigned thereto, and a fixed eyepiece for viewing the second image plane and that has a stop in the vicinity of the first image plane whose aperture diameter can be varied as a function of the magnification of the variable system in order to suppress scattered and/or false light.

11 Claims, 2 Drawing Sheets

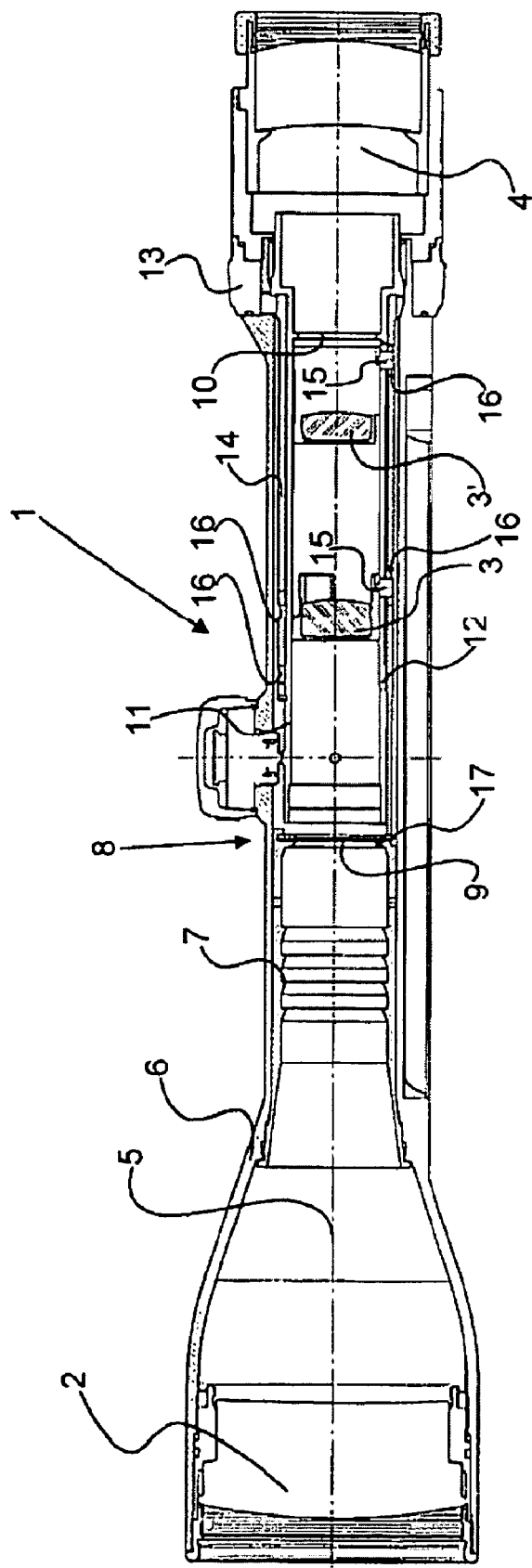
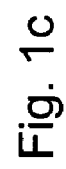
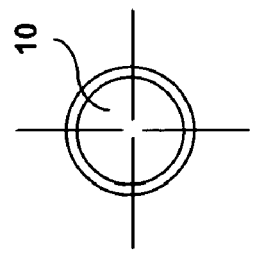
Fig. 1a
Fig. 1b
Fig. 1c

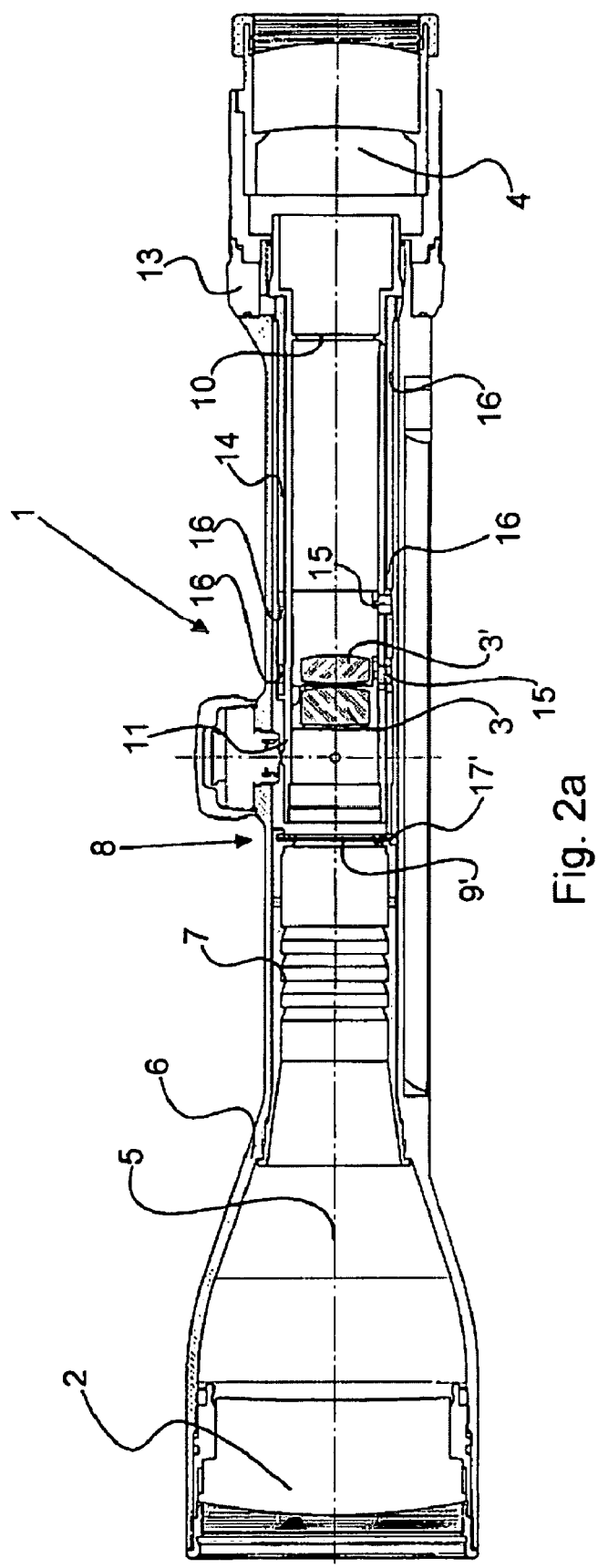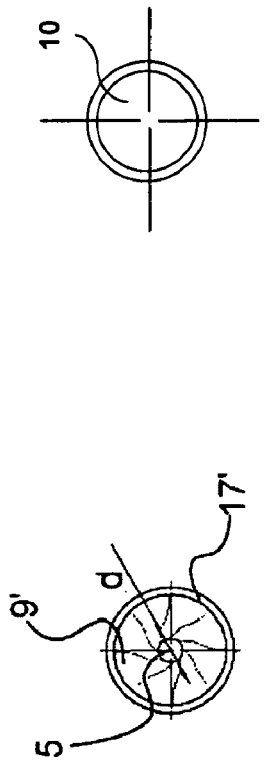

TELESCOPE WITH VARIABLE MAGNIFICATION

CROSS-REFERENCE TO RELATED PATENT APPLICATIONS

This application is a Continuation of U.S. Application PCT/DE2007/001392, filed Aug. 6, 2007, incorporated herein by reference in its entirety. The right of foreign priority is also claimed under 35 U.S.C. §119(a) based on Federal Republic of Germany Application No. 10 2006 036 942.4, filed Aug. 8, 2006, the entire contents of which, including the specification, drawings, claims and abstract, are incorporated herein by reference.

BACKGROUND OF THE INVENTION

The invention relates to a telescopic sight with variable magnification, comprising a fixed objective and first image plane assigned thereto, a variable system with second image plane assigned thereto, and a fixed eyepiece for viewing the second image plane.

Such telescopic sights are known from the prior art and are required for viewing and aiming at remote objects. It is necessary in this case to make an erect and laterally correct image available to the observer. In the case of sights with variable magnification, it is possible in conjunction with low magnification for the user to survey a large field of view that can be used to find an object easily. For the purposes of accurate aiming, the object found is observed more accurately with the aid of a large magnification, although then with a restrictive field of view. Reflections owing to tube walls or other glossy or shining parts of the telescopic sight are reduced in a known way by fitting light traps, matt construction black surfaces or stops. It is the case, in particular, in telescopic sights that the construction space is limited by mechanical stipulations, for example the fastening devices on the firearm. Consequently, stops can frequently not be fitted. For this reason, the mounts of the lenses are simultaneously used in part as stops that also have the task, inter alia, of sharply delimiting edge regions of the imaging lenses, which would yield an unsharp image, and of impeding production of images.

U.S. Pat. No. 4,255,013 discloses a telescopic sight in the case of which an inversion system can be shifted along the optical axis via an adjusting ring arranged on the eyepiece side.

U.S. Pat. No. 3,782,822 discloses a telescopic sight of the type mentioned at the beginning that has an objective and an eyepiece. The inversion system is designed as a zoom system and enables a variable magnification of the telescopic sight. An optical target is located in a rear image plane between the inversion system and eyepiece.

U.S. Pat. No. 4,172,634 discloses a lens inversion system for a telescopic sight, the said system being designed as a two-element zoom system and its adjusting elements being supported in an inner tube such that they can be displaced along the optical axis. The adjusting elements slide along the inside of the inner tube when the magnification is varied. This inside must be of smooth design for acceptable functioning, and therefore produces undesired light reflections. These disturbances, also denoted as false light or veiling glare, occur particularly when magnification is set high. Light that is incident in the objective of the telescopic sight laterally from ahead from outside the field of view is reflected on parts of the mount, for example in the lens inversion system, and passes into the eye of the observer through the eyepiece as disturbing false light. Owing to the limited conditions of construction space in the diameter of the telescopic sight, it is impossible to suppress this false light with conventional methods such as, for example, stops or light traps on the parts of the mount. As a makeshift, reflecting surfaces are anodized or painted to be black, but these measures lead at best to a reduction in the intensity of the false light. In the region of moving components, smooth and therefore necessarily reflecting, surfaces must remain, since these surfaces cannot be permanently provided with a light-absorbing layer owing to the friction generated during movement.

If, when magnification is set high, the observer does not keep the ideal distance from the eyepiece, his eye thus not being located in the so-called exit pupil position, said observer perceives a dark edge around the then reduced field of view in which disturbing reflections become visible. As soon as the eye is removed only a little from the optical axis, or the observer attempts to detect an object at the edge of the field of view, a round scattered light phenomenon occurs and clearly outshines the wide dark edge.

SUMMARY OF THE INVENTION

It was therefore an object of the present invention to improve the observation for sights with variable magnification in the case of all magnification settings, and to suppress the production of false light.

According to the invention, this object is achieved in the case of a sight of the type mentioned at the beginning by virtue of the fact that a stop whose aperture diameter can be varied as a function of the magnification of the variable system is arranged in the vicinity of the first image plane in order to suppress scattered and/or false light. This measure suppresses the production of scattered light inside the variable system, and it is possible to provide a large aperture diameter of the variable stop with magnification set low, and a small aperture diameter with magnification set high.

One advantageous refinement of the invention consists in that the aperture diameter of the variable stop can be adapted to the selected magnification in such a way that it is slightly larger than the respectively used or effective image field diameter in the vicinity of the first image plane. The mechanical configuration of the variable stop can prove to be particularly simple in this case, and can, for example, constitute a bipartite gate/format stop with a square cross section.

According to the invention, a fixed, preferably round field stop is additionally provided in the second image plane. In the case of high magnifications, the visible image field can be sharply delimited for the observer in this way despite a simple variable stop that has not exactly adapted to the image field diameter in the first image plane.

In an advantageous way, the variable stop is arranged in the first image plane, and the field stop is arranged in the second image plane. It is thereby possible for the variable stop particularly to occlude light that is laterally incident in the objective from the front from outside the field of view that would otherwise be reflected on parts of the mount, for example inside the variable system, while at the same time the field stop in the second image plane ensures that the image made available to the observer is sharply delimited.

According to the invention, the variable system in the sight comprises two or more lenses or lens groups that are displaceably supported in order to vary the magnification along the optical axis, the position of the second image plane assigned to the variable system not being varied. In this way, both the aperture of the variable stop and the position of the lenses or lens groups of the inversion system can be controlled from outside. This configuration of the invention enables a particularly compact design since, for example, an external control ring embracing the sight housing can be arranged directly in the region of the first image plane, and thus in the vicinity of the variable stop, in order to enable a direct setting of the stop. Consequently, by manual operation, the user can adapt the aperture diameter of the variable stop, and thus effectiveness of the scattered light suppression, to the given light conditions and, at the same time, to the desired image field diameter. In the case of such an embodiment, the variable system can be controlled conventionally via an adjusting ring arranged on the eyepiece side.

In an advantageous way, the lenses or lens groups of the variable system can be displaced relative to one another in an inner tube supported coaxially with the sight housing for rectilinear guidance on sliding surfaces. In this way, the reflecting surfaces in the sight housing and inside the variable system can be kept short.

In a particularly advantageous way, there is provided for displacing the variable system a rotatably supported cam carrier that encloses the inner tube and whose rotary movement simultaneously effects a variation in the aperture diameter of the variable stop. Owing to this coupling of the variation in the magnification of the sight to the variation in the aperture diameter of the variable stop, a maloperation is prevented that is possible when the user can separately undertake to set the magnification and the variable stop.

In a particularly ergonomic design of the invention, the cam carrier can be controlled manually via an actuator ring arranged on the eyepiece side.

In a further embodiment of the inventive sight, the variable system is designed as an inversion system, in particular as a lens inversion system with a negative magnification range. In this way, the variable stop can be arranged particularly effectively in the first image plane, which lies upstream of the lens inversion system, and the fixed field stop can be arranged downstream of the lens inversion system in the second image plane. To the extent enabled by the beam guidance inside the lens inversion system, it is, of course, also possible for a stop that is axially displaceable and/or can have its aperture diameter varied to be arranged inside the lens inversion system. In this case, like the individual lens elements of the inversion system, the variable stop can likewise be controlled by a cam of the cam carrier. Very individual stop arrangements adapted to the respective circumstances of the optical beam path of the type of sight are possible in this way. The movement cycles can be particularly well calibrated between the moving parts.

Of course, the term "variable stop" is also intended to cover all measures suitable for adapting the cross section of the light exit opening in the sight to a reduction in the field of view owing to a variation in the magnification. For example, resilient elements for suppressing scattered light can be bent into the optical beam path and in this way reduce the cross section. Even if it is thereby possible to attain only rectangular or square formats in the occlusion, it is nevertheless, possible to use a format stop, adapted to the image field diameter, in the second image plane to attain a sharp delimitation of the image field in conjunction with scattered light suppression. It is likewise possible to adjust the actuator ring by using electrically driven means. In this case, a difference in the ratio that may be necessary between driving the variable stop and the motorized variable adjustment is achieved with particular ease by a gearbox or a further motor that is provided only for adjusting the stop.

Further objects, features and advantages of the present invention will become apparent from the detailed description of preferred embodiments that follows, when considered together with the accompanying figures of drawing.

BRIEF DESCRIPTION OF THE DRAWINGS

An exemplary embodiment of the inventive sight with a variable stop is illustrated schematically in the drawing with the aid of a telescopic sight and explained below. In the drawing:

FIG. 1a shows a sectional illustration of a telescopic sight with magnification set low, FIG. 1b shows a variable stop with a large aperture diameter, FIG. 1c shows a fixed field stop in the second image plane.

FIG. 2a shows a sectional illustration of a telescopic sight with magnification set high, and FIG. 2b shows a variable stop with a small aperture diameter.

FIG. 2c shows a fixed field stop in the second image plane.

DETAILED DESCRIPTION OF THE PREFERRED EMBODIMENTS

FIG. 1a shows a sectional illustration of a telescopic sight 1 with variable magnification, which has on the light entry side an objective 2 of large aperture, a lens inversion system 3, 3' and an eyepiece 4. The optical axis 5 is illustrated by a dashed and dotted line. In the light direction along the optical axis 5, the telescopic sight housing 6 has a region of smaller cross section by comparison with the objective diameter in which conventional light traps 7 are integrally formed. A variable stop 9 is illustrated in a first image plane 8. A fixed field stop 10 for sharply delimiting the image field is arranged between the lens inversion system 3, 3' and the eyepiece 4.

The lens inversion system 3, 3' is supported in an axially displaceable fashion inside an inner tube 11, via a pin and slot connection 12 running parallel to the optical axis 5. The axial position and the relative position of the two elements of the lens inversion system 3, 3' relative to one another determine the magnification of the telescopic sight 1. It is set via an actuator ring 13 that is arranged on the eyepiece side and is operationally connected to a cam carrier 14 enclosing the inner tube 11. The lens elements 3, 3' are shifted axially for this purpose with the aid of guide pins 15 that engage in cams 16 of the cam carrier 14.

The aperture diameter D of the variable stop 9 can be set via an operative connection (not illustrated in more detail) between the cam carrier 14 and outer ring 17 of the variable stop 9.

FIG. 1b shows the variable stop 9 with a large aperture diameter D with reference to the example of an iris stop, in a plan view in the direction of the optical axis 5.

FIG. 2a shows a sectional illustration of the telescopic sight 1 from FIG. 1a, in the case of which a high magnification is set. The elements of the lens inversion system 3, 3' are located in a position pushed together near the first image plane 8, in which the variable stop 9' is arranged.

FIG. 2b shows the variable stop 9' with an aperture diameter d set small, in a plan view in the direction of the optical axis 5.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto and that the claims encompass all embodiments of the invention, including the disclosed embodiments and their equivalents.

LIST OF REFERENCE SYMBOLS

1 Telescopic sight
2 Objective
3, 3' Lens inversion system
4 Eyepiece
5 Optical axis
6 Telescopic sight housing
7 Light traps
8 First image plane
9, 9' Variable stop
10 Fixed field stop
11 Inner tube
12 Pin and slot connection
13 Actuator ring
14 Cam carrier
15 Guide pins
16 Cams
17, 17' Outer ring
D Large diameter
d Small diameter

What is claimed is:

1. A telescopic sight with variable magnification, comprising a fixed objective and first image plane assigned thereto, a variable system with a second image plane assigned thereto, and a fixed eyepiece for viewing the second image plane, wherein a variable stop whose aperture diameter can be varied as a function of magnification of the variable system is arranged in the vicinity of the first image plane to suppress scattered and/or veiling glare.

2. The sight as claimed in claim 1, wherein the aperture diameter of the variable stop is slightly larger than a respective image field diameter in the first image plane.

3. The sight as claimed in claim 2, wherein a fixed field stop is additionally provided in the vicinity of the second image plane.

4. The sight as claimed in claim 3, wherein the variable stop is arranged in the first image plane, and the field stop is arranged in the second image plane.

5. The sight as claimed in claim 4, wherein the variable system comprises two or more lenses or lens groups that are displaceably supported along an optical axis in order to vary the magnification, without the position of the second image plane assigned to the variable system being varied.

6. The sight as claimed in claim 3, wherein the variable system comprises two or more lenses or lens groups that are displaceably supported along an optical axis in order to vary the magnification, without the position of the second image plane assigned to the variable system being varied.

7. The sight as claimed in claim 6, wherein both the aperture of the variable stop and the position of the lenses or lens groups of the variable system can be controlled from outside.

8. The sight as claimed in claim 7, wherein the lenses or lens groups of the variable system can be displaced relative to one another for rectilinear guidance on sliding surfaces in an inner tube supported coaxially with a sight housing.

9. The sight as claimed in claim 8, wherein there is provided for displacing the variable system a rotatably supported cam carrier that encloses the inner tube and whose rotary movement simultaneously effects a variation in the aperture diameter of the variable stop.

10. The sight as claimed in claim 9, wherein the cam carrier can be controlled manually via an actuator ring arranged on an eyepiece side.

11. The sight as claimed in claim 1, wherein the variable system is designed as a lens inversion system with a negative magnification range.

* * * * *